US010796384B2

(12) United States Patent
Sanio et al.

(10) Patent No.: US 10,796,384 B2
(45) Date of Patent: Oct. 6, 2020

(54) SUGGESTING PRE-CREATED GROUPS BASED ON A USER WEB IDENTITY AND ONLINE INTERACTIONS

(71) Applicant: Google Inc., Mountain View, CA (US)

(72) Inventors: Jason Robert Richard Sanio, Mountain View, CA (US); Courtney Hampson, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 1273 days.

(21) Appl. No.: 14/292,713

(22) Filed: May 30, 2014

(65) Prior Publication Data

US 2015/0347556 A1 Dec. 3, 2015

(51) Int. Cl.
G06Q 50/00 (2012.01)
H04L 29/08 (2006.01)
H04L 12/58 (2006.01)
G06Q 10/10 (2012.01)
H04L 12/18 (2006.01)
H04W 4/08 (2009.01)
H04W 4/21 (2018.01)

(52) U.S. Cl.
CPC ............ *G06Q 50/01* (2013.01); *G06Q 10/10* (2013.01); *G06Q 10/107* (2013.01); *H04L 12/185* (2013.01); *H04L 51/32* (2013.01); *H04L 67/22* (2013.01); *H04L 67/306* (2013.01); *H04W 4/08* (2013.01); *H04W 4/21* (2018.02)

(58) Field of Classification Search
CPC .................................................... G06Q 50/01
See application file for complete search history.

(56) References Cited

U.S. PATENT DOCUMENTS

| 7,680,770 | B1* | 3/2010 | Buyukkokten | ........ G06Q 10/10 340/573.1 |
| 9,247,015 | B2* | 1/2016 | Ruffner | |
| 9,299,060 | B2* | 3/2016 | Panzer | .................. G06Q 10/10 |
| 9,612,996 | B1* | 4/2017 | Vanderwater | ....... G06F 16/9535 |
| 2009/0319288 | A1* | 12/2009 | Slaney | .................. G06Q 10/10 705/1.1 |

(Continued)

FOREIGN PATENT DOCUMENTS

JP 2001-175680 A 6/2001

OTHER PUBLICATIONS

International Search Report and Written Opinion for International Patent Application Serial No. PCT/US2014/040389, dated Feb. 25, 2015, 13 pages.

(Continued)

*Primary Examiner* — William L Bashore
*Assistant Examiner* — Nathan K Shrewsbury
(74) *Attorney, Agent, or Firm* — Lowenstein Sandler LLP

(57) ABSTRACT

In one aspect, a method for generating groupings of users at a social networking service is provided, the method includes determining identifying information for a user, identifying one or more other users having a set of identifying information in common with the user, generating a group including the user and the one or more other users, associating the set of identifying information common between the user and the one or more other users with the group and providing recommendations to the user for activity with respect to the one or more other users based on the set of identifying information.

20 Claims, 3 Drawing Sheets

(56) References Cited

U.S. PATENT DOCUMENTS

| | | | |
|---|---|---|---|
| 2010/0257207 A1* | 10/2010 | Oe | G06F 16/9535 707/784 |
| 2010/0287033 A1* | 11/2010 | Mathur | G06F 16/9535 705/319 |
| 2011/0173662 A1* | 7/2011 | Beppu | H04N 21/44218 725/46 |
| 2012/0005224 A1* | 1/2012 | Ahrens | G06F 16/285 707/769 |
| 2012/0084188 A1* | 4/2012 | Zuber | G06Q 40/12 705/34 |
| 2012/0191715 A1* | 7/2012 | Ruffner | G06F 17/30011 707/738 |
| 2012/0197723 A1 | 8/2012 | Watfa et al. | |
| 2012/0278740 A1* | 11/2012 | Robinson | G06F 17/30867 715/757 |
| 2013/0073389 A1* | 3/2013 | Heath | G06Q 50/01 705/14.54 |
| 2013/0073473 A1* | 3/2013 | Heath | G06Q 30/06 705/319 |
| 2013/0073556 A1 | 3/2013 | Valeski | |
| 2013/0088484 A1 | 4/2013 | Marra et al. | |
| 2013/0110583 A1* | 5/2013 | Ormont | G06Q 50/01 705/7.29 |
| 2013/0246518 A1 | 9/2013 | Nace | |
| 2013/0268591 A1* | 10/2013 | Chen | H04L 51/32 709/204 |
| 2013/0304658 A1* | 11/2013 | Zhou | G06Q 30/02 705/319 |
| 2014/0067826 A1* | 3/2014 | Jackson | G06F 17/30699 707/748 |
| 2014/0074893 A1* | 3/2014 | Griffin | G06F 16/9535 707/798 |
| 2014/0108562 A1 | 4/2014 | Panzer | |
| 2014/0156391 A1* | 6/2014 | Neri | G06Q 30/0251 705/14.49 |
| 2014/0365484 A1* | 12/2014 | Freeman | G06F 16/95 707/736 |
| 2015/0032535 A1* | 1/2015 | Li | G06Q 50/01 705/14.53 |
| 2015/0046458 A1* | 2/2015 | Hu | G06F 17/30029 707/738 |
| 2015/0058075 A1* | 2/2015 | Tomlinson | G06Q 50/01 705/7.29 |
| 2015/0080027 A1* | 3/2015 | Amrhein | H04W 4/12 455/456.3 |
| 2015/0095183 A1* | 4/2015 | Desmond | G06Q 50/01 705/26.7 |
| 2015/0256634 A1* | 9/2015 | Bastide | G06Q 50/01 709/204 |
| 2016/0315996 A1* | 10/2016 | Ha | G06F 3/04847 |

OTHER PUBLICATIONS

Chinese Office Action for Chinese Application No. 201480079202. 8, dated May 11, 2020, 17 pages.

* cited by examiner

SUGGESTING PRE-CREATED GROUPS BASED ON A USER WEB IDENTITY AND ONLINE INTERACTIONS

BACKGROUND

Users of a social networking service may create groups of their contacts, in order to organize their contacts. Creating groups can be difficult, and it can often be hard to identify all of the contacts to be associated with a certain group to create a meaningful group. For example, if a user wishes to create a group with all of his/her college friends, the user has to search individually for each friend (e.g., whether they are an existing contact or new contact), and manually add the friend to a group.

SUMMARY

The disclosed subject matter relates to a machine-implemented method for generating groupings of users at a social networking service, the method comprising determining identifying information for a user. The method may further include identifying one or more other users having a set of identifying information in common with the user. The method may further include generating a group including the user and the one or more other users. The method may further include associating the set of identifying information common between the user and the one or more other users with the group. The method may further include providing recommendations to the user for activity with respect to the one or more other users based on the set of identifying information. Other aspects can be embodied in corresponding systems and apparatus, including computer program products.

The disclosed subject matter also relates to a system for for generating groupings of users at a social networking service, the system comprising one or more processors and a machine-readable medium comprising instructions stored therein, which when executed by the processors, cause the processors to perform operations comprising determining identifying information for a user across multiple accounts of the user. The operations may further include generating one or more characterizations for the user based on the user identifying information. The operations may further include generating a group including the user and one or more other users sharing at least one of the one or more characterizations. The operations may further include associating the at least one of the one or more characterizations common between the user and the one or more other users with the group. The operations may further include providing recommendations to the user for activity with respect to the group based on the characterizations associated with the group. Other aspects can be embodied in corresponding systems and apparatus, including computer program products.

The disclosed subject matter also relates to a machine-readable medium including instructions stored therein, which when executed by a machine, cause the machine to perform operations including determining identifying information for a user across multiple accounts of the user. The operations may further include generating one or more characterizations for the user based on the user identifying information. The operations may further include comparing characterizations of a plurality of other users at a social networking service with the characterizations of the user. The operations may further include generating a group including the user and one or more other users sharing one or more characterizations based on the comparison. The operations may further include associating the one or more characterizations shared between the user and the one or more other users with the group. The operations may further include providing recommendations to one or more of the user or the one or more other users for activity with respect to the group based on the one or more characterizations associated with the group. Other aspects can be embodied in corresponding systems and apparatus, including computer program products.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
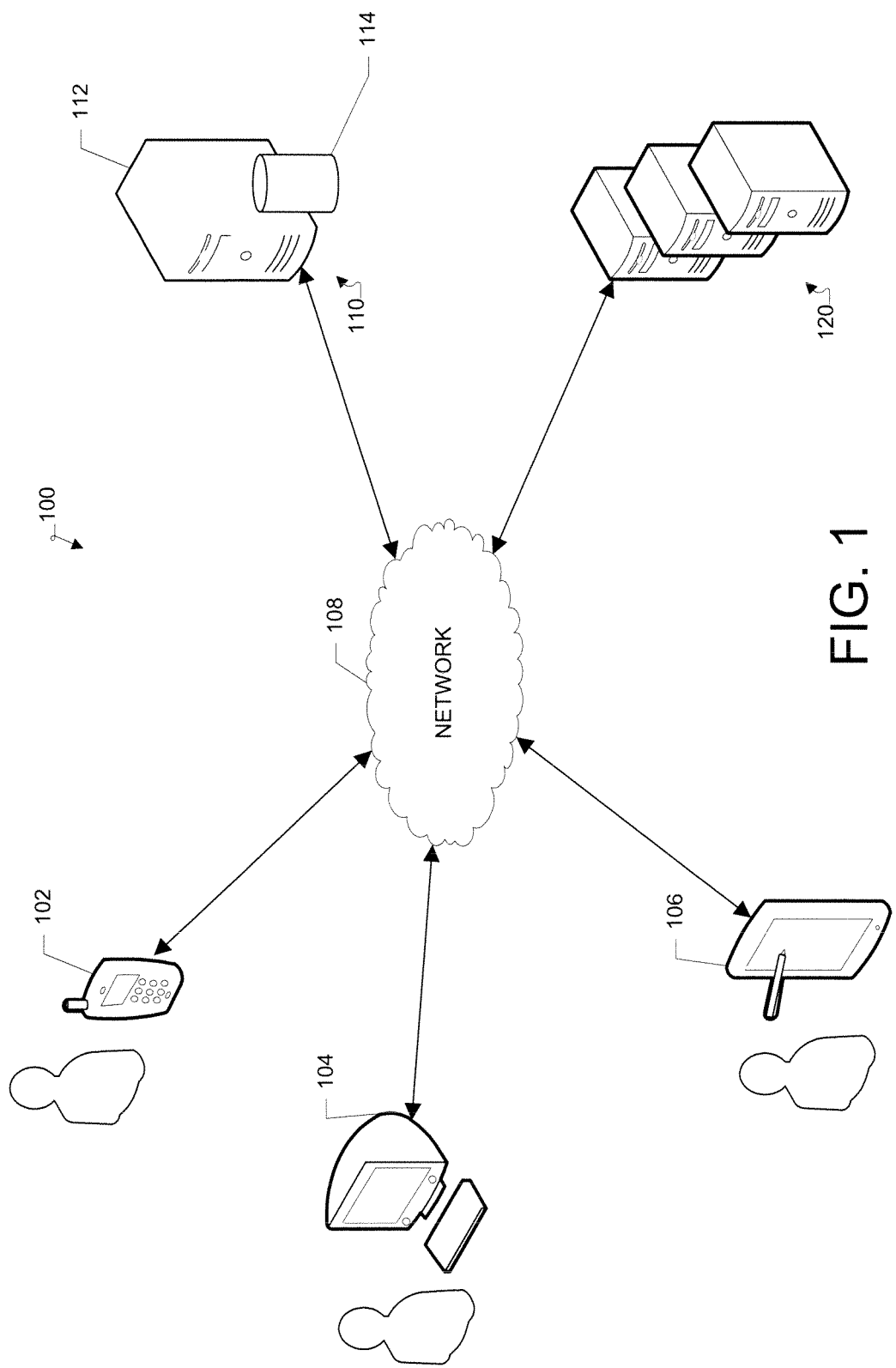
FIG. 1 illustrates an example client-server network environment, which provides for generating pre-created groups based on a user web identity, online interactions and other factors and/or providing activity recommendations for the group based on information used to generate the group.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s) 120). Such user associations may be defined on a user-to-user basis, or as a group of users associated through membership within a group. As used herein, "contacts" refer to other users that a user is associated with, at one or more social networking services.

A user may create "social groups" ("groups") including one or more contacts to organize his/her associations. The groups may be additionally used to control distribution of messages and content to contacts of the user. For example, groups may include categories to which a user can assign their social networking contacts and better control the distribution and visibility of social networking messages as well as other multimedia content (e.g., documents, and other collaboration objects). In accordance with the subject disclosure, a group is provided as a data set defining a collection of contacts that are associated with one another. As used herein, a group can be described from the perspective of an individual that is the center of a particular collection of socially interconnected people, or from the aggregate perspective of a collection of socially interconnected people. In some examples, a group can have narrowly defined boundaries, all of the members of the group may be familiar with one another, and permission may be required for a member to join a group. In accordance with the subject disclosure, a user of an electronic device may define a group, and the group, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

In some examples, it may be possible to automatically (e.g., without user interaction) determine grouping of contacts for creating groups for a user based on the user's social activity and online interactions. The subject disclosure provides a method for suggesting pre-created groups based on a user web identity, online interactions and other factors. The method takes existing knowledge about a user to suggest the creation of a group and suggest contacts for inclusion in the group. The user can then accept the suggested group and create the group without any further effort. The information used to generate the group can be stored in association with the group and used to generate recommendations for further activity with respect to the group.

In one example, information about a given user is gathered (e.g., information similar to those described above). In one example, one or more sources of user information may be parsed to determine information regarding the user. For example, multiple user accounts (e.g., linked to one another or to same user social account), such as email accounts, user social accounts or other user accounts may be identified for the user. The multiple user accounts are then parsed to gather information regarding the user. For examples, the profile information and/or affinity or contact information at the user accounts may be parsed to determine identifying information for the user. In addition, information regarding social activity and interactions of the user may be used to determine information regarding the user based on social activity of the user (e.g., user relationships, affinity). In one example, further identifying information may also be gathered based on accounts and/or information regarding contacts of the user.

Possible sources of information about a user may include email domains for identifying users with the same domain in their email address as the user or contacts of the user (e.g. @washington.edu for all of a user's college friends or @acecharter.org for people the user works with), one or more social pages for identifying users who all manage a social page as the user or contacts of the user (e.g. manages of the Google Science Fair Google+ page, people who manage a site on Wildfire, admins of the same Twitter account), email messages and social interactions between users to determine various activity indicators including for example information regarding how users address others in email salutations (e.g. suggesting a group for anyone they write "Hey Mom," "Hey dad", etc. to as a "Family" group), identifying users who commonly collaborate on collaboration objects together (e.g. all users who are editing the 40th birthday surprise party doc), identifying users who are commonly emailed at the same time (e.g. user or contact of the user typically emails the same 6 people on mass emails), and/or users who are sent mail with consistent email titles (e.g. creating a "Kickball" group out of the people you send emails to with Kickball in the title, or a "Roomies" group for people who you send rent reminders to).

For example, the information regarding an example user may include the user use of their @washington.edu email address, graduation year, college and major. The information may then be used to identify one or more categorizations for the example user. For example, the user of the above example may be identified as someone that graduated from University of Washington in 2009 with a Psychology major from the X college.

In one example, the information regarding the user may be used to generate a query to identify other users having commonalities with the user. The generated query may, for example, be used to identify users with the same categorization as the user across a social network (e.g., a social network associated with a social networking service). For example, the query for the user in the above example may attempt to identify other users who graduated from the same school as the user, on the same year, and/or with the same major. The identified users are then grouped to create recommended groups. In one example, groupings may further be based on identifying information regarding other users within the group (e.g., to identify additional users) or other contacts of the user.

Once the groups are generated, the categorization information used to identify the group is stored as metadata in association with the group. The information is then used to recommend activity with respect to the group. In one example, activity by the user and/or one or more other users of the group may generate an activity relating to the group. In such examples, the activity leads to recommendations being generated for actions to be taken in response to the activity. For example, the metadata may be used to identify content that may be of interest to the group members, and may lead to recommendations for sharing the content with the group. In another example, where the user generates events relating to the group categorizations (e.g., a school reunion) the metadata may be used to automatically link the group with the event. In one example, the recommendations may include activity relating to distribution of messages and content to contacts of the user within the group to facilitate better control of the distribution and visibility of social networking messages as well as other multimedia content (e.g., documents, and other collaboration objects) relating to the group.

FIG. 1 illustrates an example client-server network environment, which provides for generating pre-created groups based on a user web identity, online interactions and other factors and/or providing activity recommendations for the group based on information used to generate the group. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate generating pre-created groups based on a user web identity, online interactions and other factors for a user interacting with electronic devices 102, 104, 106 and/or providing activity recommendations for the group based on information used to generate the group to a user interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various social networking services. In one example, remote servers 120 may further host other services including email services, shopping services, search engines, and/or user accounts at one or more services. Server 110 and one or more remote servers 120 may be further capable of maintaining social graphs of users and their contacts. The services hosted on the server 110 or one or more remote servers 120 may enable users to create a profile and associate themselves with other users at a remote social networking service. The server 110 and/or remote servers 120 may further facilitate the generation and maintenance of a social graph including the user created associations. The social graphs may include, for example, a list of all users of the social networking service(s) and their associations with other users of the social networking service(s).

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
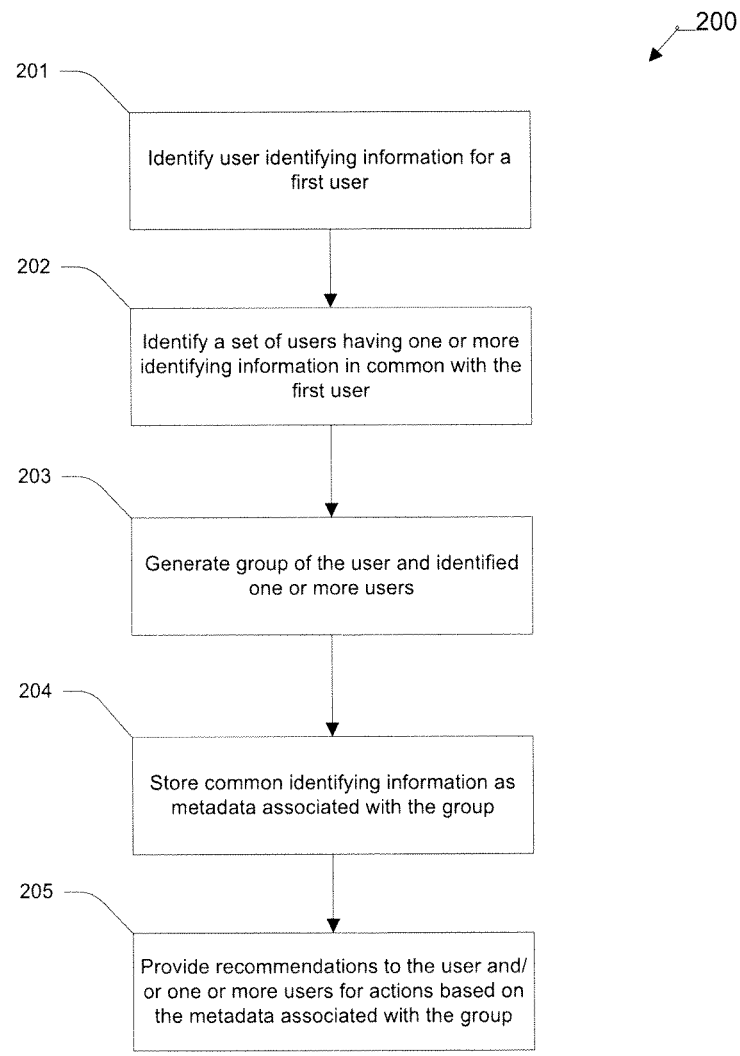
FIG. 2 illustrates a flow diagram of an example process for generating pre-created groups based on a user web identity, online interactions and other factors and/or providing activity recommendations for the group based on information used to generate the group.

FIG. 2 illustrates a flow diagram of an example process 200 for generating pre-created groups based on a user web identity, online interactions and other factors and/or providing activity recommendations for the group based on information used to generate the group.

In step 201, user identifying information for a user is determined. In one example, one or more sources of user information may be parsed to determine information regarding the user.

Possible sources of information about a user may include email domains for identifying users with the same domain in their email address as the user or contacts of the user (e.g. @washington.edu for all of a user's college friends or @acecharter.org for people the user works with), one or more social pages for identifying users who all manage a social page as the user or contacts of the user (e.g. manages of the Google Science Fair Google+ page, people who manage a site on Wildfire, admins of the same Twitter account), email messages and social interactions between users to determine various activity indicators including for example information regarding how users address others in email salutations (e.g. suggesting a group for anyone they write "Hey Mom," "Hey dad", etc. to as a "Family" group), identifying users who commonly collaborate on collaboration objects together (e.g. all users who are editing the 40th birthday surprise party doc), identifying users who are commonly emailed at the same time (e.g. user or contact of the user typically emails the same 6 people on mass emails), and/or users who are sent mail with consistent email titles (e.g. creating a "Kickball" group out of the people you send emails to with Kickball in the title, or a "Roomies" group for people who you send rent reminders to).

In one example, a set of user accounts of a user across one or more services are identified (e.g., user account linked to one another or to same user social account). In one example, the user accounts may include multiple user email accounts, user social accounts or other user accounts. The multiple user accounts are parsed to gather information regarding the user. In one example, user contact accounts and/or existing groups may further be parsed to determine information regarding the user. The information may be gathered from user profile information and/or social activity information.

In step 202, a set of users having one or more commonalities with the user are identified based on the identifying information determined in step 201. In one example, one or more categorizations for the user may be generated according to the identifying information determined in step 201. The categorization information may then be used to identify one or more other users having commonalities with the user.

In one example, the information regarding the user (e.g., identifying information determined in step 201 and/or categorizations generated based on such identifying information), may be used to generate a query to identify other users (e.g., other users across a social network) with commonalities with the user. The generated query may, for example, be used to identify users with the same categorization as the user across a social network (e.g., a social network associated with a social networking service).

In step 203, a group including the one or more users having a set of commonalities with the user is generated. In one example, the query generated to identify one or more users in step 202, may include one or more identifying information and/or categorizations as common characteristics. The query may identify one or more users having commonalities with the user based on the identifying information and/or categorizations. In one example, the grouping may further be based on information regarding other users within the group or other contacts of the user. The identified one or more users may be grouped to create recommended groups. In one example, groupings may also be generated and/or supplemented using information regarding other users within the group or other contacts of the user.

In one example, the pre-generated group is provided as a recommendation for the user and the user may select to accept the group. In one example, a notification may also be provided to the other users of the group, and/or an acceptance may be received from the other users to become members of the group.

In step 204, the one or more common identifying information of the user and/or one or more users of the group is stored in association with the group. For example, the common identifying information is stored as metadata in association with the group. In step 205, recommendations may be provided to the user and/or other users of the group for actions based on the metadata associated with the group. For example, the metadata may be used to identify content that may be of interest to the group members, and may lead to recommendations for sharing the content with the group. In another example, where the user generates events relating to the group categorizations (e.g., a school reunion) the metadata may be used to automatically link the group with the event.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
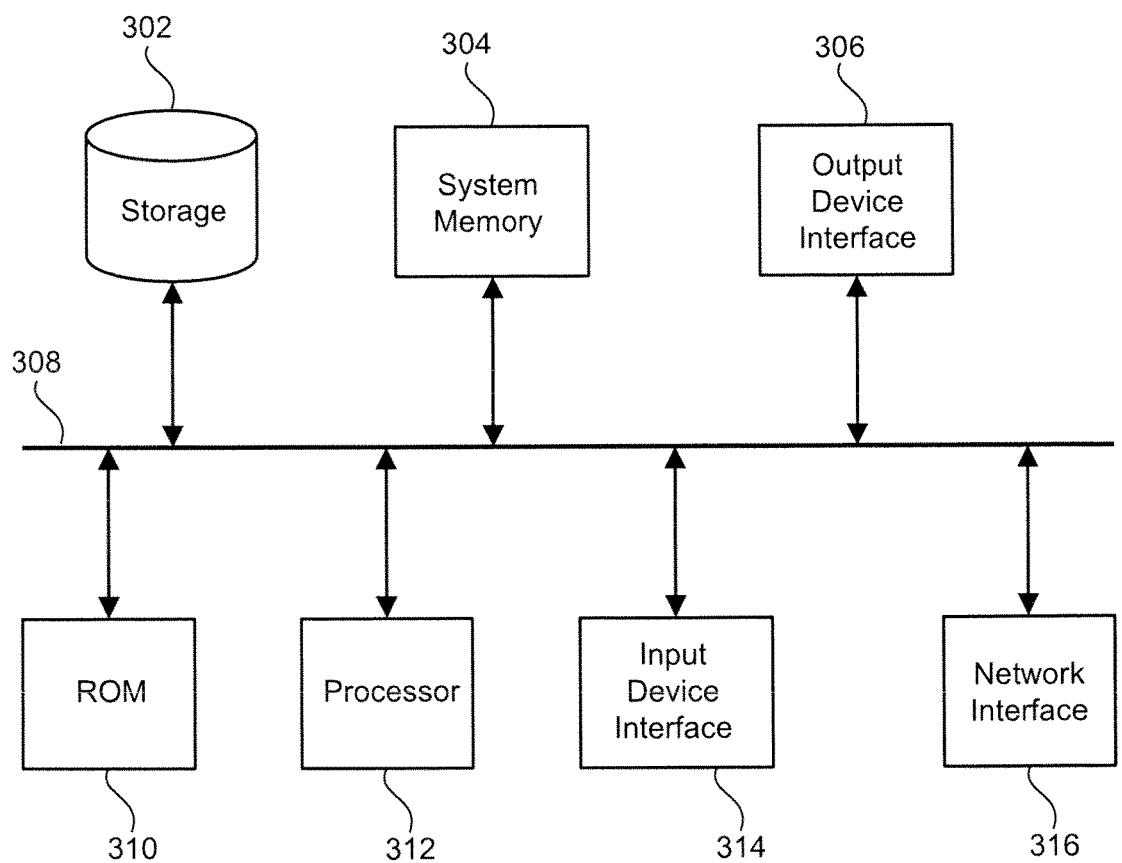
FIG. 3 conceptually illustrates an electronic system with which some implementations of the subject technology are implemented.

FIG. 3 conceptually illustrates an electronic system with which some implementations of the subject technology are implemented. Electronic system 300 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 300 includes a bus 308, processing unit(s) 312, a system memory 304, a read-only memory (ROM) 310, a permanent storage device 302, an input device interface 314, an output device interface 306, and a network interface 316.

Bus 308 collectively represents all system, peripheral, and chipset buses that communicatively connect the numerous internal devices of electronic system 300. For instance, bus 308 communicatively connects processing unit(s) 312 with ROM 310, system memory 304, and permanent storage device 302.

From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by processing unit(s) 312 and other modules of the electronic system. Permanent storage device 302, on the other hand, is a read-and-write memory device. This device is a non-volatile memory unit that stores instructions and data even when electronic system 300 is off. Some implementations of the subject disclosure use a mass-storage device (such as a magnetic or optical disk and its corresponding disk drive) as permanent storage device 302.

Other implementations use a removable storage device (such as a floppy disk, flash drive, and its corresponding disk drive) as permanent storage device 302. Like permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for managing multimedia messages according to various implementations. From these various memory units, processing unit(s) 312 retrieves instructions to execute and data to process in order to execute the processes of some implementations.

Bus 308 also connects to input and output device interfaces 314 and 306. Input device interface 314 enables the user to communicate information and select commands to the electronic system. Input devices used with input device interface 314 include, for example, alphanumeric keyboards and pointing devices (also called "cursor control devices"). Output device interfaces 306 enables, for example, the display of images generated by the electronic system 300. Output devices used with output device interface 306 include, for example, printers and display devices, such as cathode ray tubes (CRT) or liquid crystal displays (LCD). Some implementations include devices such as a touchscreen that functions as both input and output devices.

Finally, as shown in FIG. 3, bus 308 also couples electronic system 300 to a network (not shown) through a network interface 316. In this manner, the computer can be a part of a network of computers (such as a local area network ("LAN"), a wide area network ("WAN"), or an Intranet, or a network of networks, such as the Internet. Any or all components of electronic system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method comprising:
   determining identifying information for a user;
   identifying one or more other users having a set of identifying information in common with the user;
   generating a group including the user and the one or more other users; and
   upon generating the group:
      generating metadata based on the set of identifying information common between the user and the one or more other users, wherein generating the metadata further comprises:
         identifying a set of characterizations indicating a reason for generating the group based on the set of identifying information common between the user and the one or more other users with the group; and
         generating the metadata for the group based on the set of characterizations;
      associating the metadata with the group to identify content related to one or more real-life social activities to be of interest to the user and the one or more other users; and
      providing a recommendation to the user for a real-life social activity with respect to the one or more other users of the group based on the metadata, the recommendation being generated based on another real-life social activity participated in by the one or more other users after generating the group.

2. The method of claim 1, wherein identifying the one or more other users comprises:
   generating one or more categorizations for the user according to the information for the user, the categorizations corresponding to real-life social activities previously participated in by the user; and
   identifying one or more other users having at least one of the one or more categorizations in common with the user.

3. The method of claim 1, wherein the identifying information for the user is determined from information across multiple user accounts associated with the user.

4. The method of claim 3, further comprising:
   identifying the multiple user accounts for the user based on the identifying information for the user and the real-life social activity associated with the user; and
   traversing the information at the multiple user accounts.

5. The method of claim 1, wherein the identifying information for the user is determined based on user account information associated with one or more user accounts associated with the user.

6. The method of claim 1, wherein the identifying information for the user is determined based on prior real-life social activity of the user.

7. The method of claim 6, wherein determining the identifying information for the user comprises, analyzing content of the prior real-life social activity of the user at one or more user accounts of the user to determine the identifying information for the user.

8. The method of claim 1, wherein providing the recommendation to the user comprises:
   detecting, after generating the group, an event being related to the group based on the set of identifying information associated with the group;
   determining an action in response to the event in response to the detection; and
   providing the action as another recommendation to the user.

9. The method of claim 1, wherein generating the metadata further comprises:
   storing the metadata in association with the group.

10. The method of claim 1, wherein generating the group comprises:
    providing the group as a recommendation to the user; and
    receiving an indication of user acceptance of the group.

11. The method of claim 10, further comprising:
    adding the group and the associated set of identifying information to a user account of the user at a social networking service.

12. The method of claim 10, further comprising:
    providing a notification of the group being generated to each of the one or more other users.

13. A system comprising:
a memory; and
a processing device, operatively coupled with the memory, to:
  determine identifying information for a user across multiple accounts of the user;
  generate a characterization for the user based on the identifying information for the user;
  generate a group including the user and one or more other users sharing the characterization, wherein the characterization pertains to prior participation in a common real-life social activity by the user and the one or more other users; and
  upon generating the group:
    generate metadata based on the characterization common between the user and the one or more other users, wherein for generating the metadata, the processing device is further to:
      identify a set of characterizations indicating a reason for generating the group based on the set of identifying information common between the user and the one or more other users with the group; and
      generate the metadata for the group based on the set of characterizations;
    associate the metadata with the group to identify content related to one or more real-life social activities to be of interest to the user and the one or more other users; and
    provide recommendations to the user for a real-life social activity with respect to the group based on the metadata, at least one of the recommendations being generated responsive to another real-life social activity performed by the one or more other users subsequent to generating the group.

14. The system of claim 13, wherein the identifying information for the user includes one or more of social profile information or real-life social activity information regarding the user.

15. The system of claim 13, wherein providing recommendations to the user comprises:
  detecting an event being related to the group based on the characterization associated with the group;
  determining an action in response to the event in response to the detection; and
  providing the action as a recommendation to the user.

16. The system of claim 13, wherein generating the group comprises:
  providing the group as a recommendation to the user; and
  receiving an indication of user acceptance of the group.

17. The system of claim 16, the operations further comprising:
  adding the group and the associated characterization to a user account of the user at a social networking service.

18. The system of claim 16, the operations further comprising:
  providing a notification of the group being generated to the one or more other users.

19. The system of claim 18, the operations further comprising:
  receiving acceptance of the group from the one or more other users; and
  adding the one or more other users to the group responsive to receiving the acceptance.

20. A non-transitory machine-readable storage medium comprising instructions stored therein, which when executed by a processor of a machine, cause the processor to:
  determine identifying information for a user across multiple accounts of the user;
  generate a characterization for the user based on the identifying information for the user;
  compare characterizations of a plurality of other users at a social networking services with the characterization of the user;
  generate a group including the user and one or more other users sharing the characterization based on the comparing; and
  upon generating the group:
    generate metadata based on the characterization common between the user and the one or more other users, wherein for generating the metadata, the processor is further to:
      identify a set of characterizations indicating a reason for generating the group based on the set of identifying information common between the user and the one or more other users with the group; and
      generate the metadata for the group based on the set of characterizations;
    associate the metadata with the group to identify content related to one or more real-life social activities to be of interest to the user and the one or more other users; and
    provide recommendations to the one or more other users for a real-life social activity with respect to the group based on the metadata, at least one of the recommendations being generated responsive to another real-life social activity performed by the one or more other users subsequent to generating the group.

* * * * *